(12) United States Patent
Kohno et al.

(10) Patent No.: US 7,759,420 B2
(45) Date of Patent: *Jul. 20, 2010

(54) LAYERED SILICATE AND THERMOPLASTIC RESIN COMPOSITION CONTAINING IT

(75) Inventors: Kazuteru Kohno, Yamaguchi (JP); Nobuaki Kido, Yamaguchi (JP); Shunichi Matsumura, Yamaguchi (JP)

(73) Assignee: Teijin Limited, Osaka (JP)

( * ) Notice: Subject to any disclaimer, the term of this patent is extended or adjusted under 35 U.S.C. 154(b) by 1157 days.

This patent is subject to a terminal disclaimer.

(21) Appl. No.: 10/572,677

(22) PCT Filed: Sep. 16, 2004

(86) PCT No.: PCT/JP2004/013977
§ 371 (c)(1),
(2), (4) Date: Mar. 20, 2006

(87) PCT Pub. No.: WO2005/028366
PCT Pub. Date: Mar. 31, 2005

(65) Prior Publication Data
US 2007/0106004 A1    May 10, 2007

(30) Foreign Application Priority Data
Sep. 18, 2003    (JP) .............................. 2003-325672

(51) Int. Cl.
C08K 3/28    (2006.01)
C08K 3/32    (2006.01)
C08K 9/04    (2006.01)
C08K 5/17    (2006.01)
C08K 3/34    (2006.01)
C09C 1/42    (2006.01)

(52) U.S. Cl. .................... 524/445; 524/447; 524/186; 524/492; 516/101; 501/148

(58) Field of Classification Search .................. 523/500; 524/445, 447, 186, 492; 516/101; 501/148
See application file for complete search history.

(56) References Cited

U.S. PATENT DOCUMENTS 2,966,506 A    12/1960    Jordan (Continued)

FOREIGN PATENT DOCUMENTS

EP    1 538 183 A1    6/2005

(Continued)

OTHER PUBLICATIONS

Cher H. Davis et al.; Effects of Melt-Processing Condition on the Quality of Poly(ethylene terephthalate) Montmorillonite Clay Nanocomposites; Journal of Polymer Science, Part B: Polymer Physics 20021201 John Wiley and Sons Inc. US, vol. 40, No. 23 Dec. 1, 2002, pp. 2661-2666.

(Continued)

*Primary Examiner*—Mark Eashoo
*Assistant Examiner*—Michael Pepitone
(74) *Attorney, Agent, or Firm*—Sughrue Mion, PLLC (57) ABSTRACT

A layered silicate characterized by being ion-exchanged with an organic onium ion at 50-100% of its ion-exchange capacity, and by having a specific surface area of 2.5-100 $m^2/g$, as well as a resin composition comprising a thermoplastic resin and the aforementioned layered silicate, the resin composition being characterized in that the layered silicate content is 0.01-20 parts by weight as inorganic ash with respect to 100 parts by weight of the thermoplastic resin, and the average number of layers of the layered silicate in the thermoplastic resin is 2-8 layers. Also, a film which comprises the resin composition.

7 Claims, 1 Drawing Sheet

U.S. PATENT DOCUMENTS

| | | | |
|---|---|---|---|
| 4,568,687 A * | 2/1986 | Wright et al. | 514/399 |
| 4,684,654 A * | 8/1987 | Wright et al. | 514/266.21 |
| 5,635,075 A | 6/1997 | Boyd et al. | |
| 5,879,589 A * | 3/1999 | Miyanaga et al. | 252/500 |
| 7,189,782 B2 * | 3/2007 | Hashidzume et al. | 524/601 |
| 2002/0028870 A1 * | 3/2002 | Lan et al. | 524/445 |
| 2005/0089698 A1 * | 4/2005 | Hashidzume et al. | 428/448 |

FOREIGN PATENT DOCUMENTS

| | | |
|---|---|---|
| GB | 1 213 122 | 11/1970 |
| JP | 9-48908 A | 2/1997 |
| JP | 9-309720 A | 12/1997 |
| JP | 2001-261947 A | 9/2001 |
| JP | 2003-95640 A | 4/2003 |
| JP | 2003-327851 A | 11/2003 |
| WO | WO 2004024820 A1 * | 3/2004 |

OTHER PUBLICATIONS

Walid H. Awad et al.: Thermal degradation studies of alkyl-imidazolium salts and their application in nanocomposites; Proceedings—Electrochemical Society, 2002-19(Molten Salts XIII), 200-212.

Dictionary of Chemistry and Chemical Engineering, 1st ed., Jan. 31, 2003, p. 1273.

* cited by examiner

Fig. 1

Fig. 2 ained by a second aspect of the present invention which is

LAYERED SILICATE AND THERMOPLASTIC RESIN COMPOSITION CONTAINING IT

TECHNICAL FIELD

The present invention relates to an ion-exchanged layered silicate, to a process for its production, to a thermoplastic resin composition comprising the layered silicate and a thermoplastic resin, and to a film composed of the resin composition. More specifically, the invention relates to an ion-exchanged layered silicate which can be suitably dispersed in a thermoplastic resin composition, to a thermoplastic resin composition having the layered silicate suitably dispersed in a thermoplastic resin, and to a film composed of the resin composition.

BACKGROUND ART

Thermoplastic resins such as polyesters are used for a variety of purposes taking advantage of their excellent mechanical properties, moldability, heat resistance, weather resistance, light fastness and chemical resistance. With advancing technology in recent years, however, even more superior properties are being required for resins depending on their intended uses. Recently, such demanded properties are increasingly being achieved by techniques using "nanocomposites", or compositions having laminar compounds dispersed on the nanoscale in thermoplastic resins. Formation of nanocomposites can realize improvement in a variety of properties, including enhanced high heat resistance, high elasticity, flame retardance and gas barrier performance (for example, see Nakajo K., "The World of Nanocomposites", Kogyo Chosakai, 2000). Laminar compounds must be dispersed on the nanoscale in order to form nanocomposites, and several different methods have been attempted. For example, for production of a polyester composite material having a laminar compound dispersed on a monolayer level, there has been disclosed the use of an organic cation having a functional group which is reactive with the polyester monomer, as an organic modified form of the laminar compound (Japanese Unexamined Patent Publication HEI No. 9-48908). There has also been described a polyester resin composition comprising a uniformly dispersed molten mixture of a layered silicate in a polyester resin, while maintaining a layer structure of 5-20 layers with an interlaminar distance of 15-35 Å (Japanese Unexamined Patent Publication No. 2001-261947). In addition, Japanese Unexamined Patent Publication No. 2003-327851 describes a process for production of a laminar inorganic crystal-polymer composite by freeze-drying of a swelling laminar inorganic crystal and impregnation thereof in a molten polymer. However, nanocomposites which employ polyesters cannot achieve the same degree of dispersion as polyamides, and therefore improvement in dispersibility has been desired.

DISCLOSURE OF THE INVENTION

It is an object of the present invention to provide an ion-exchanged layered silicate which can be suitably dispersed in thermoplastic resin compositions, a process for its production, a thermoplastic resin composition comprising the layered silicate and a thermoplastic resin, and a film composed of the resin composition.

Additional objects and advantages of the present invention will become apparent by the description which follows hereunder.

These objects and advantages are achieved by the aspect of the present invention which is a layered silicate characterized by being ion-exchanged with an organic onium ion at 50-100% of its ion-exchange capacity, and by having a specific surface area of 2.5-100 m$^2$/g.

The aforementioned objects and advantages are also achieved by a second aspect of the present invention which is a resin composition comprising a thermoplastic resin and the aforementioned layered silicate, wherein the layered silicate content is 0.01-20 parts by weight as inorganic ash with respect to 100 parts by weight of the thermoplastic resin.

BEST MODE FOR CARRYING OUT THE INVENTION

The present invention will now be explained in greater detail.

The layered silicate used for the invention preferably has a 2:1 form with an octahedral sheet structure containing Al, Mg, Li or the like sandwiched between two SiO$_4$ tetrahedral sheet structures, and specifically there may be mentioned smectite-based clay minerals such as saponite, hectorite, fluorohectorite, montmorillonite, beidellite or stevensite, swelling synthetic micas such as Li-type fluorotaeniolite, Na-type fluorotaeniolite, Na-type fluorotetrasilicic mica and Li-type fluorotetrasilicic mica, as well as vermiculite, fluorovermiculite, halloysite and swelling mica. These may be natural or synthetic materials. Among these, smectite-based clay minerals such as montmorillonite and hectorite, Li-type fluorotaeniolite and Na-type fluorotetrasilicic mica are preferred for use from the standpoint of cationic exchange capacity.

The layered silicate is obtained by ion-exchange of a layered silicate with an organic onium ion at 50-100% of its ion-exchange capacity.

As organic onium ions there are preferred quaternary onium ions such as phosphonium and ammonium, or heteroaromatic ions. The organic onium ion more preferably is represented by the following formula (1).

(wherein M is a nitrogen or phosphorus atom. $R_1$, $R_2$, $R_3$ and $R_4$ each independently represent a C1-30 hydrocarbon group or a heteroatom-containing hydrocarbon group, or any of $R_1$, $R_2$, $R_3$ and $R_4$ may optionally form a ring.)

In the organic onium ion represented by formula (1) above, M is preferably a phosphorus atom to form a phosphonium ion, or M is a nitrogen atom and any of $R_1$, $R_2$, $R_3$ and $R_4$ form a ring as a heteroaromatic ion.

As C1-30 hydrocarbon groups there may be mentioned alkyl groups and aromatic groups. As alkyl groups there are preferred C1-18 alkyl groups, with preferred examples being methyl, ethyl, n-propyl, n-butyl, n-dodecyl, n-tridecyl, n-tetradecyl, n-pentadecyl, n-hexadecyl, n-heptadecyl and n-octadecyl. As aromatic groups there are preferred phenyl, biphenyl, benzyl, tosyl and the like. These aromatic groups may also have substituents which do not affect their thermal stability, such as methyl, ethyl, fluorine or chlorine.

As specific examples of quaternary ammonium ions wherein M is a nitrogen atom there may be mentioned as preferable tetraalkylammonium ions such as tetramethylammonium, tetraethylammonium, tetrabutylammonium, triethylbenzylammonium, tetraoctylammonium, trimethyldecylammonium, trimethyldodecylammonium, trimethylhexadecylammonium, trimethyloctadecylammonium, tributylmethylammonium, tributyldodecylammonium, tributyloctadecylammonium, trioctylethylammonium and tributylhexadecylammonium, or methyltriphenylammonium and ethyltriphenylammonium.

As specific examples of organic phosphonium ions wherein M is a phosphorus atom there may be mentioned tetraethylphosphonium, triethylbenzylphosphonium, tetrabutylphosphonium, tetraoctylphosphonium trimethyldecylphosphonium, trimethyldodecylphosphonium, trimethylhexadecylphosphonium, trimethyloctadecylphosphonium, tributylmethylphosphonium, tributyldodecylphosphonium, tributyloctadecylphosphonium, trioctylethylphosphonium, tributylhexadecylphosphonium, methyltriphenylphosphonium, ethyltriphenylphosphonium, diphenyldioctylphosphonium, triphenyloctadecylphosphonium, tetraphenylphosphonium and tributylallylphosphonium.

When formula (1) above represents hydrocarbon groups containing hetero atoms, at least some of the C1-30 hydrocarbon groups $R_1$, $R_2$, $R_3$ and $R_4$ are preferably one or more selected from the group consisting of C1-30 hydroxyl-substituted hydrocarbon groups, alkoxy-substituted hydrocarbon groups, phenoxy-substituted hydrocarbon groups or imide-substituted hydrocarbon groups.

Hydrocarbon groups having hetero atom-containing substituents are listed below. (In these formulas, a and b are each independently integers of 1-29, and the numbers of carbon atoms in the formulas are no greater than 30).

Hydroxyl-substituted hydrocarbon groups:

Alkoxy-substituted hydrocarbon group:

Phenoxy-substituted hydrocarbon group:

Imide-substituted hydrocarbon groups:

For cases in which $R_1$, $R_2$, $R_3$ and $R_4$ form a ring to constitute a heteroaromatic ion, there may be mentioned organic onium ions comprising pyridine derivatives such as pyridine, methylpyridine, ethylpyridine, dimethylpyridine, hydroxypyridine and dimethylaminopyridine, imidazole derivatives such as imidazole, methylimidazole, dimethylimidazole, ethylimidazole and benzimidazole, and pyrazole derivatives such as pyrazole, methylpyrazole, dimethylpyrazole, ethylpyrazole and benzpyrazole.

Examples of imidazole derivatives include alkyl-substituted imidazolium ions such as N-methylimidazolinium, N-ethylimidazolinium, N-hexylimidazolinium, N-octylimidazolinium, N-dodecylimidazolinium and N-hexadecylimidazolinium, and the aforementioned structures given as examples of hydrocarbon groups having heteroatom-containing substituents, as N-substituted imidazolium groups or their alkyl-substituted forms.

The aforementioned organic onium ions may be used alone or in combinations. As organic onium ions there are preferred those having a phosphonium or imidazolium structure from the standpoint of heat resistance of the layered silicate. Preferred specific examples of organic onium ions include alkylphosphonium ions such as tetrabutylphosphonium, tetraoctylphosphonium, tributyldodecylphosphonium and tributylhexadecylphosphonium, or alkyl-substituted imidazolium ions such as N-methylimidazolinium, N-ethylimidazolinium, N-hexylimidazolinium, N-octylimidazolinium, N-dodecylimidazolinium and N-hexadecylimidazolinium, as well as the following onium ions wherein one or more of the alkyl groups is replaced with an imide-substituted hydrocarbon group.

-continued (In these formulas, a is an integer of 1-29.)

In the substituents mentioned above, the preferred value for a may differ depending on the type or combination of dispersing layered silicate or thermoplastic resin.

The layered silicate of the invention is ion-exchanged with such an organic onium ion at 50-100% of the cation-exchange capacity of the layered silicate.

The cation-exchange capacity of the layered silicate may be measured by a conventional publicly known method, but a suitable ion-exchange capacity of the layered silicate used for the invention is about 0.2-3 meq/g, among the layered silicates mentioned above. A cation-exchange capacity of at least 0.2 meq/g is advantageous from the viewpoint of dispersibility, since the introduction rate of the organic onium ion will be increased. A capacity of no greater than 3 meq/g is preferred in order to facilitate introduction of the organic onium ion. The cation-exchange capacity is more preferably 0.8-1.5 meq/g.

The cation-exchange rate of the layered silicate of the invention is 50-100%, because a cation-exchange rate of at least 50% is advantageous from the standpoint of dispersibility since the introduction rate of the organic onium ion with respect to the layered silicate will be increased. A cation-exchange rate of no greater than 100% is advantageous from the standpoint of thermal stability since this will exclude counter ions of the onium compound used as the starting material. The cation-exchange rate is more preferably 55-99% and even more preferably 60-99%.

The cation-exchange rate may be calculated by the following formula (2):

$$\text{Cation-exchange rate (\%)} = \{Wf/(1-Wf)\}/(Morg/Msi) \times 100 \quad (2)$$

(Wf is the weight reduction rate according to differential thermogravimetric analysis of the layered silicate from 120° C. to 800° C. at a temperature-elevating rate of 20° C./min, Morg is the molecular weight of the phosphonium ion, and Msi is the molecular weight per electrical charge of the cationic portion of the layered silicate. The molecular weight per electrical charge of the cationic portion of the layered silicate is the value calculated as the reciprocal of the cation-exchange capacity of the layered silicate (units: eq/g).) (109 meq/100 g in the case of Kunipia F.)

The presence or absence of onium ion not contributing to cation-exchange of the layered silicate can be confirmed based on measurement of any counter ion of the onium compound used as the starting material, using conventional publicly known methods such as fluorescent X-ray or atomic absorption analysis.

The layered silicate of the invention preferably has a 5 wt % weight reduction temperature of 310° C. or higher, as measured by differential thermogravimetric analysis in a nitrogen atmosphere with a temperature-elevating rate of 20° C./min. If the 5 wt % weight reduction temperature is lower than 310° C., the decomposition during melt kneading with the thermoplastic resin will be significant, often resulting in poorer resin properties such as re-aggregation of the layered silicate and generation of decomposition gas. From this viewpoint, the 5 wt % weight reduction temperature is preferably as high as possible, and in consideration of the structure of an organic onium ion imparting satisfactory dispersibility to the layered silicate of the invention, it is preferably 330° C. or higher, more preferably 340° C. or higher and even more preferably 350° C. or higher.

The layered silicate of the invention is characterized by having a specific surface area of 2.5-100 $m^2/g$. The specific surface area can be determined by the BET method using nitrogen. A specific surface area of 2.5 $m^2/g$ or greater will improve the dispersion efficiency for melt kneading with resins, to obtain a thermoplastic resin composition comprising a layered silicate and thermoplastic resin in a satisfactory uniform dispersion. Conversely, if the specific surface area is greater than 100 $m^2/g$, the fine particles will have an excessively large specific surface area and high density, and it will be difficult to manage as powder. The specific surface area is more preferably 4-80 $m^2/g$ and even more preferably 5-50 $m^2/g$.

The method of cation exchange of the layered silicate with the organic onium ion may be a conventional publicly known method. Specifically, the layered silicate may be dispersed in a polar solvent such as water, ethanol or methanol, and the organic onium ion, or a solution containing the organic onium ion, added thereto.

The preferred concentration of the layered silicate in the layered silicate dispersion is 0.1-5 wt %. The concentration is preferably not lower than 0.1 wt % from the viewpoint of manageability, because the total amount of the solution will be too great. It is also preferably not greater than 5 wt % because the viscosity of the layered silicate dispersion will become too high, thus lowering the cation-exchange rate. The concentration of the layered silicate is more preferably 0.5-4.5 wt % and even more preferably 1-4 wt %.

The temperature for the cation-exchange reaction is preferably about 20-80° C. in the case of water, for example, for a viscosity sufficiently low to allow stirring of the layered silicate dispersion.

The layered silicate of the invention may be produced by freeze drying an organic onium ion-exchanged layered silicate using a medium with a melting point of at least −20° C. and below 100° C. The medium used for freeze drying preferably has a melting point of at least −20° C. If the melting point of the medium is lower than −20° C., the freezing temperature for the medium will be too low, thereby reducing the medium elimination efficiency.

Examples of preferred media to be used for freeze drying include water, benzene, cyclohexane, cyclohexanone, benzyl alcohol, p-dioxane, cresol, p-xylene, acetic acid and cyclohexanol.

The medium used for the freeze drying may be the same type used for the cation-exchange reaction dispersion, or it may be a medium in which the cation-exchanged layered silicate satisfactorily disperses. Particularly in the case of a medium in which the layered silicate satisfactorily disperses, the freeze drying can be carried out with the layered silicate layers kept in a separated state, thereby vastly increasing the specific surface area.

The freeze drying is carried out by freezing the dispersion comprising the layered silicate and the medium and then removing the medium under reduced pressure. The concentration of the layered silicate in the dispersion during freeze drying is normally about 0.5-70 wt %, or if the solvent is a good solvent, the concentration range may be about 0.1-50 wt %. The layered silicate concentration in the dispersion is preferably not too high because gelling may occur. It is preferably 0.5-30% and more preferably 1-10 wt %. There is no particular restriction on the type of freeze dryer, and a commercially available freeze dryer may be used.

Here, "satisfactory dispersion" means a state in which the layered silicate is free and swelled in a good dispersing medium, and this can be judged by the TEM measurement method of Shomer et al. (C. and Clay Minerals, Vol. 26, 135-138(1978)), or by a method of measuring interlaminar distance by wide-angle X-ray measurement. The degree of satisfactory dispersion is preferably an interlaminar distance of at least 1 nm for the layered silicate as determined by X-ray measurement in the good dispersing medium.

Freeze drying carried out in this manner can produce a layered silicate according to the invention.

The resin composition of the invention is a resin composition characterized by comprising a thermoplastic resin and the layered silicate described above, wherein the layered silicate content is 0.01-20 parts by weight as inorganic ash with respect to 100 parts by weight of the thermoplastic resin, and the average number of layers of the layered silicate in the thermoplastic resin is 2-8 layers.

The inorganic ash is the residue remaining after thermogravimetric analysis in air up to 800° C. An inorganic ash content of at least 0.1 part by weight is preferred in order to exhibit the effect of adding the layered silicate. It is also preferably no greater than 20 parts by weight for melt molding of the obtained thermoplastic resin composition. From this viewpoint, the layered silicate content is more preferably 0.5-12 parts by weight and even more preferably 1-8 parts by weight as inorganic ash with respect to 100 parts by weight of the thermoplastic resin.

There are no particular restrictions on the thermoplastic resin used for the invention so long as it is a thermoplastic resin capable of being melt molded, but it is preferably at least one selected from the group consisting of polyesters, polyamides, polyimides, polycarbonates, polyphenylenesulfides and polyolefin-based resins. Polyesters and polycarbonates are preferred.

A polyester is the product of polycondensation of a dicarboxylic acid and/or its derivative with a diol, or a hydroxycarboxylic acid-derived product, or a copolymer of the foregoing. As dicarboxylic acid components for the polyester there may be mentioned aromatic dicarboxylic acids such as terephthalic acid, isophthalic acid, orthophthalic acid, 2,6-naphthalenedicarboxylic acid, 2,7-naphthalenedicarboxylic acid, 1,5-naphthalenedicarboxylic acid, 4,4'-biphenyldicarboxylic acid, 2,2'-biphenyldicarboxylic acid, 4,4'-diphenyletherdicarboxylic acid, 4,4'-diphenylmethanedicarboxylic acid, 4,4'-diphenylsulfonedicarboxylic acid, 4,4'-diphenylisopropylidenedicarboxylic acid and 5-sodiumsulfoisophthalic acid, aliphatic dicarboxylic acids such as oxalic acid, succinic acid, adipic acid, sebacic acid, dodecanedicarboxylic acid, octadecanedicarboxylic acid, maleic acid and fumaric acid, and cyclic aliphatic dicarboxylic acids such as 1,4-cyclohexanedicarboxylic acid. As diols there may be mentioned aliphatic diols such as ethylene glycol, 1,2-propyleneglycol, 1,3-propyleneglycol, 1,3-butanediol, 1,4-butanediol, 2,2-dimethylpropanediol, neopentyl glycol, 1,5-pentadiol, 1,6-hexanediol, 1,8-octanediol, 1,10-decanediol, 1,4-cyclohexanedimethanol, 1,3-cyclohexanedimethanol, 1,2-cyclohexanedimethanol, trimethylene glycol, tetramethylene glycol, pentamethylene glycol, octamethylene glycol, diethylene glycol and dipropylene glycol, and diphenols such as hydroquinone, resorcinol, bisphenol A and 2,2-bis(2'-hydroxyethoxyphenyl)propane. As hydroxycarboxylic acids there may be mentioned aromatic hydroxycarboxylic acids such as p-hydroxybenzoic acid, p-hydroxyethoxybenzoic acid, 6-hydroxy-2-naphthoic acid, 7-hydroxy-2-naphthoic acid and 4'-hydroxy-biphenyl-4-carboxylic acid.

As examples of preferred polyesters there may be mentioned polyethylene terephthalate (PET), polybutylene terephthalate, polycyclohexylenedimethylene terephthalate, polyethylene-2,6-naphthalate, polybutylene naphthalate, polyethyleneisophthalate-terephthalate copolymer and p-hydroxybenzoic acid-6-hydroxy-2-naphthoic acid copolymer.

A polyamide is the product of polycondensation of a dicarboxylic acid and/or its derivative with a diamine, or an aminocarboxylic acid-derived product, or a copolymer of the foregoing. As carboxylic acid components for polyamides there may be mentioned aliphatic dicarboxylic acids such as adipic acid, sebacic acid, dodecanedicarboxylic acid and octadecanedicarboxylic acid, cyclic aliphatic dicarboxylic acids such as 1,4-cyclohexanedicarboxylic acid, and aromatic dicarboxylic acids such as terephthalic acid, isophthalic acid, orthophthalic acid, 2,6-naphthalenedicarboxylic acid, 2,7-naphthalenedicarboxylic acid, 1,5-naphthalenedicarboxylic acid, 4,4'-biphenyldicarboxylic acid, 2,2'-biphenyldicarboxylic acid, 4,4'-diphenyletherdicarboxylic acid, 4,4'-diphenylmethanedicarboxylic acid and 4,4'-diphenylsulfonedicarboxylic acid. As diamines there may be mentioned aliphatic diamines such as butanediamine, butanediamine, pentanediamine, hexanediamine, heptanediamine, nonanediamine and dodecanediamine, substituted aliphatic diamines such as trimethyl-1,6-hexanediamine, and aromatic diamines such as m-phenylenediamine, p-phenylenediamine, 1,4-diaminonaphthalene, 1,5-diaminonaphthalene, 1,8-diaminonaphthalene, 2,6-diaminonaphthalene, 2,7-diaminonaphthalene, 3,3'-diaminobiphenyl, 4,4'-diaminobiphenyl, 4,4'-diaminobenzophenone, 3,3'-diaminodiphenylether, 3,4'-diaminodiphenylether, 4,4'-diaminodiphenylether, 3,3'-diaminodiphenylmethane, 4,4'-diaminodiphenylmethane, 3,3'-diaminodiphenylsulfone, 4,4'-diaminodiphenylsulfone, 3,3'-diaminodiphenylsulfide, 4,4'-diaminodiphenylsulfide, 4,4'-diaminodiphenylthioether, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,1-bis(4-aminophenyl)ethane and 2,2-bis(4-aminophenyl)propane. These may be used alone or in combinations. As aminocarboxylic acids there may be mentioned aliphatic aminocarboxylic acids such as 6-aminohexanoic acid and 12-aminododecanoic acid, and aromatic aminocarboxylic acids such as p-aminobenzoic acid, 6-amino-2-naphthoic acid and 7-amino-2-naphthoic acid.

Preferred examples of polyamides include aliphatic polyamides such as nylon-6,6, nylon-6 and nylon-12, semi-aromatic polyamides such as polyhexamethylene terephthalamide and polyhexamethylene isophthalamide, and their copolymers.

A polyimide is the product of polycondensation of a tetracarboxylic acid and/or its derivative with a diamine, or an aminodicarboxylic acid-derived product, or a copolymer of the foregoing. As tetracarboxylic acid components for the polyimide there may be mentioned pyromellitic acid, 1,2,3,4-benzenetetracarboxylic acid, 2,2',3,3'-benzophenonetetracarboxylic acid, 2,3',3,4'-benzophenonetetracarboxylic acid, 3,3',4,4'-benzophenonetetracarboxylic acid, 3,3',4,4'-biphenyltetracarboxylic acid, 2,2',3,3'-biphenyltetracarboxylic acid, 2,3,3',4'-biphenyltetracarboxylic acid, 1,2,4,5-naphthalenetetracarboxylic acid, 1,2,5,6-naphthalenetetracarboxylic acid, 1,2,6,7-naphthalenetetracarboxylic acid, 1,4,5,8-naphthalenetetracarboxylic acid, 2,3,6,7-naphthalenetetracarboxylic acid, 3,4,9,10-perylenetetracarboxylic acid, bis(2,3-dicarboxyphenyl)ether, bis(3,4-dicarboxyphenyl)ether, bis (2,3-dicarboxyphenyl)methane, bis(3,4-dicarboxyphenyl) methane, bis(2,3-dicarboxyphenyl)sulfone, bis(3,4-dicarboxyphenyl)sulfone, 1,1-bis(2,3-dicarboxyphenyl) ethane, 1,1-bis(3,4-dicarboxyphenyl)ethane, 2,2-bis(2,3-dicarboxyphenyl)propane, 2,2-bis(3,4-dicarboxyphenyl) propane, 1,1,1,3,3,3-hexafluoro-2,2-bis(3,4-dicarboxyphenyl)propane dianhydride and bis(3,4-dicarboxyphenyl)dimethylsilane dianhydride. As diamines there may be mentioned aliphatic diamines such as butanediamine, pentanediamine, hexanediamine, heptanediamine, nonanediamine and dodecanediamine, and substituted aliphatic diamines such as isophoronediamine and trimethyl-1, 6-hexanediamine. These may be used alone or in combinations. As aminodicarboxylic acids there may be mentioned aliphatic aminocarboxylic acids such as 6-aminohexanoic acid and 12-aminododecanoic acid.

Specific preferred examples of polyimides include para-dodecamethylenepyromellitic imide and paraundecamethylenepyromellitic imide. Examples of preferred commercially available products include ULTEM (polyetherimide) and the like.

Examples of polycarbonates include polycarbonates composed of various bisphenols. As bisphenols there may be mentioned bis(4-hydroxyaryl)alkanes such as bis(4-hydroxyphenyl)methane, 2,2-bis(4-hydroxyphenyl)propane, 1,1-bis (4-hydroxyphenyl)ethane, 2,2-bis(4-hydroxy-3-methylphenyl)propane, 2,2-bis(4-hydroxyphenyl)heptane, 2,2-bis(4-hydroxy-3,5-dichlorophenyl)propane, 2,2-bis(4-hydroxy-3, 5-dibromophenyl)propane, bis(4-hydroxyphenyl) phenylmethane, 4,4'-dihydroxyphenyl-1,1'-m-diisopropylbenzene and 4,4'-dihydroxyphenyl-9,9-fluorene, bis(hydroxyaryl)cycloalkanes such as 1,1-bis(4-hydroxyphenyl)cyclopentane, 1,1-bis(4-hydroxyphenyl)cyclohexane, 1-methyl-1-(4-hydroxyphenyl)-4-(dimethyl-4-hydroxyphenyl)methyl-cyclohexane, 4-[1-[3-(4-hydroxyphenyl)-4-methylcyclohexyl]-1-methylethyl]-phenol, 4,4'-[1-methyl-4-(1-methylethyl)-1,3-cyclohexanediyl]bisphenol and 2,2,2',2'-tetrahydro-3,3,3',3'-tetramethyl-1,1'-spirobis-[1H-indene]-6, 6'-diol, dihydroxyaryl ethers such as bis(4-hydroxyphenyl) ether, bis(4-hydroxy-3,5-dichlorophenyl)ether and 4,4'-dihydroxy-3,3-dimethylphenyl ether, dihydroxydiaryl sulfides such as 4,4'-dihydroxydiphenyl sulfide and 4,4'-dihydroxy-3,3'-dimethyldiphenyl sulfide, dihydroxydiaryl sulfoxides such as 4,4'-dihydroxydiphenyl sulfoxide and 4,4'-dihydroxy-3,3'-dimethyldiphenyl sulfoxide, and dihydroxydiarylsulfones such as 4,4'-dihydroxydiphenylsulfone and 4,4'-dihydroxy-3,3'-dimethyldiphenylsulfone. Preferred among these from the standpoint of physical properties and cost are polycarbonates comprising 2,2-bis(2'-hydroxyphenyl)propane.

A polyphenylenesulfide has aromatic rings polymerized with sulfide bonds, and there may be mentioned as examples branched or straight-chain polyphenylenesulfides and their copolymers. Specifically, there may be mentioned para-phenylenesulfide, meta-phenylenesulfide and their copolymers, and copolymers having in the molecule ether units, sulfone units, biphenyl units, naphthyl units, substituted phenylsulfide units or trifunctional phenylsulfide units which are copolymerizable therewith. Para-phenylenesulfide is preferred among these.

As polyolefin-based resins there may be mentioned nonalicyclic polyolefins such as polyethylene, polypropylene and poly(4-methylpentene-1), and alicyclic polyolefin-based resins such as norbornene-α-olefin copolymers, dicyclopentadiene-α-olefin copolymer hydride, ring-opening copolymer hydrides of norbornene derivatives or tetracyclododecene derivatives and hydrogenated polystyrene-based resins. Specific examples include norbornene derivative-α-olefin copolymers such as TOPAS by Ticona Co. and APEL by Mitsui Chemical Co., Ltd., and ring-opening copolymer hydrides of norbornene derivatives or tetracyclododecene derivatives, such as ZEONEX and ZEONA by Nippon Zeon Co., Ltd. or ARTON by JSR Corp.

The resin composition of the invention is characterized in that the average number of layers of the layered silicate in the thermoplastic resin is 2-8 layers. The average number of layers of the layered silicate may be determined by utilizing the scattering angle and half-value width of the scattering peak due to scattering between layered silicate layers in X-ray scattering, calculating the interlaminar distance and layer thickness, and dividing the layer thickness by the interlaminar distance.

The method of determining the layer thickness from the half-value width may utilize the Scherrer formula shown as formula (3) below.

$$D = K \cdot \lambda / \beta \cos \theta \quad (3)$$

D: Crystallite size
$\lambda$: Measuring X-ray wavelength
$\beta$: Half-value width
$\theta$: Bragg angle of diffraction line
K: Scherrer constant When the layered silicate is separated into a single layer it will not be detected by this method, but confirmation of an average number of 2-8 layers in the resin composition is sufficient for the purpose of the invention. A single layer may also be included in the composition so long as the moldability, and especially the flow property of the composition is not impaired, but because the flexural modulus usually decreases with a smaller layer thickness, single layer-separated layered silicate in the resin composition of the invention preferably constitutes no more than 50% and more preferably no more than 30% of the total, based on the number of single layers of the layered silicate. This number can be estimated by determining the average numerical ratio using a transmission electron microscope. When the average number of layers is small, as mentioned above, a smaller layer thickness reduces the flexural modulus. On the other hand, an average number of layers exceeding 8 results in inadequate dispersion of the layered silicate, thus reducing the effect of improving physical properties by dispersion of the layered silicate. The average number of layers is more preferably 3-7, even more preferably 3.5-6 and most preferably 4-5.

The resin composition of the invention may be produced by mixing a thermoplastic resin with the aforementioned layered silicate that has been ion-exchanged with an organic onium ion. The method of mixing the layered silicate and the thermoplastic resin may be a method of melt kneading the layered silicate with the thermoplastic resin using a single-screw or twin-screw extruder, or a method of dispersing the layered silicate with the thermoplastic resin starting material or polymerization solvent during the polymerization reaction for the thermoplastic resin, to obtain a composition. While a satisfactory dispersion can be obtained by either method, a method of melt kneading of the layered silicate with the thermoplastic resin is preferred from the standpoint of minimizing the heat history of the ion-exchanged layered silicate. The melt kneading method may be, for example, a method of pre-mixing the layered silicate with powder or granules of the thermoplastic resin and melt kneading them together, or a method of adding the layered silicate to the molten thermoplastic resin using a side feeder or the like and melt kneading them.

For melt kneading, the shear rate is preferably 250/s or greater. The shear rate is determined by the following formula (4).

$$\gamma = \pi \cdot d \cdot (N/60)/C \quad (4)$$

(γ: shear rate (/s), d: screw inner diameter (mm), N: screw rotation (rpm), C: clearance between screw and barrel (mm))

The melt kneading may be carried out by a conventional publicly known process utilizing, for example, an extruder such as a single-screw extruder or twin-screw extruder. The shear rate is preferably not less than 250/s because the kneading performance will be inadequate and the dispersibility of the layered silicate in the polyester composition will be insufficient. The shear rate is more preferably 280/s or greater and even more preferably 300/s or greater.

The temperature for melt kneading is preferably between the flow start temperature of the polyester (the glass transition temperature for an amorphous resin, or the melting point for a crystalline resin) and 350° C., more preferably between (flow start temperature +5)° C. and 330° C., and even more preferably between (flow start temperature +10)° C. and 320° C. The temperature is preferably not lower than the flow start temperature because this will render melt molding difficult, while it is preferably not higher than 350° C. because this will result in intense decomposition of the ion-exchanged layered silicate.

By using a single-screw or twin-screw extruder for melt kneading of the layered silicate with the thermoplastic resin, it is possible to obtain a composition having the layered silicate dispersed to a high degree even if the layered silicate is poorly dispersible in the thermoplastic resin. This will permit suitable usage for purposes in which surface properties are important, for example, for various molding resin materials such as fibers, films and the like.

The resin composition of the invention can be melt molded according to a conventional publicly known process. The melt molding temperature is preferably between the flow start temperature of the thermoplastic resin (the glass transition temperature for an amorphous resin, or the melting point for a crystalline resin) and 350° C., more preferably between (flow start temperature +5)° C. and 330° C., and even more preferably between (flow start temperature +10)° C. and 320° C. The temperature is preferably not lower than the flow start temperature because this will render melt molding difficult, while it is preferably not higher than 350° C. because this will result in intense decomposition of the ion-exchanged layered silicate.

A film can be satisfactorily obtained from a resin composition comprising the thermoplastic resin and the layered silicate.

A film of the invention has a high degree of dispersibility of the layered silicate, and exhibits excellent heat resistance, gas barrier properties, flame retardance, elasticity and toughness. For the purpose of obtaining a film with excellent mechanical strength, it is preferred to use a polyester and especially polyethylene-2,6-naphthalate, as the thermoplastic resin of the composition and film.

The thickness of a film obtained for the invention is preferably 3-50 μm. According to the invention, the high dispersibility of the layered silicate allows production of high-strength films even with small thicknesses (for example, film thicknesses of 3-20 μm).

For production of a film, the resin composition comprising the thermoplastic resin and the layered silicate is preferably melt molded and stretched. The film stretching method is preferably a method of successive or simultaneous drawing in a uniaxial direction or biaxial directions. More specifically, the stretching temperature is preferably between the glass transition temperature of the resin composition and the glass transition temperature +90° C., more preferably between the glass transition temperature of the resin composition and the glass transition temperature +70° C., and even more preferably between the glass transition temperature and the glass transition temperature +60° C. The stretching temperature is preferably not too low or too high because it will be difficult to produce a uniform film. The stretching percentage is preferably between a factor of 2 and 10, more preferably between a factor of 4 and 70 and even more preferably between a factor of 6 and 50, in terms of the plane factor.

According to the invention, if the thermoplastic resin is crystalline it is preferred to promote and consolidate crystallization of the resin composition by heat treatment after stretching orientation of the film. The heat treatment temperature is preferably between the glass transition temperature and the melting point of the resin. A more preferred temperature range may be determined in consideration of the crystallization temperature of the obtained film and the physical properties of the obtained film.

EFFECT OF THE INVENTION

The ion-exchanged layered silicate of the invention can be satisfactorily dispersed in a thermoplastic resin composition. The thermoplastic resin composition of the invention has a high degree of dispersibility of the layered silicate and exhibits excellent heat resistance, gas barrier properties, flame retardance, elasticity and toughness, and can be used for various molded articles, fibers and films.

EXAMPLES

The present invention will now be explained in greater detail by the following examples, with the understanding that the invention is in no way restricted by these examples.

The present invention will now be explained in greater detail by the following examples, with the understanding that the invention is in no way restricted by these examples.

(1) Layered silicates:

Montmorillonite (Kunipia (sodium exchange volume: 109 meqv/100 g), product of Kunimune Kogyo Co., Ltd.) was used. The interlaminar distance was 12.6 Å.

Fluoromica F (product of Co-Op Chemical Co., Ltd., sodium exchange volume: 120 meqv/100 g) was used. The interlaminar distance was 9.8 Å.

(2) Cation-exchange rate: This was determined based on weight reduction rate calculated by the following formula, upon heating to 800° C. in an air atmosphere at 20° C./min using a TG8120 differential thermogravimeter by Rigaku Corp.

This was determined based on weight reduction rate calculated by the following formula, upon heating to 800° C. in an air atmosphere at 20° C./min using a TG8120 differential thermogravimeter by Rigaku Corp.

$$\text{Cation-exchange rate } (\%) = \{Wf/(1-Wf)\}/(Morg/Msi) \times 100 \quad (2)$$

(Wf is the weight reduction rate according to differential thermogravimetric analysis of the layered silicate from 120° C. to 800° C. at a temperature-elevating rate of 20° C./min, Morg is the molecular weight of the phosphonium ion, and Msi is the molecular weight per electrical charge of the cationic portion of the layered silicate. The molecular weight per electrical charge of the cationic portion of the layered silicate is the value calculated as the reciprocal of the cation-exchange capacity of the layered silicate (units: eq/g).)

(3) Weight ratio of thermoplastic resin and inorganic component of layered silicate in resin composition:

This was determined based on weight reduction rate calculated by the following formula, upon heating to 800° C. in an air atmosphere at 20° C./min using a TG8120 differential thermogravimeter by Rigaku Corp.

(4) Thermal decomposition temperature: This was determined as the temperature to 5 wt % weight reduction, with heating to 800° C. in nitrogen at 20° C./min using a TG8120 differential thermogravimeter by Rigaku Corp.

(5) Layered silicate interlaminar distance and average number of layers: This was calculated from the diffraction peak positions using a RAD-B powder X-ray diffracting device by Rigaku Corp. Calculation was performed using 0.9 as the Scherrer constant.

(6) Reduced viscosity (ηsp/C): The reduced viscosity was measured using a phenol/tetrachloroethane (4:6 weight ratio) solution at a concentration of 1.2 g/dL and a temperature of 35° C.

(7) Specific surface area: The specific surface area was measured using $N_2$ gas in a NOVA 1200 by Quantum Chrome Co., and divided by the weight of the sample.

Reference Example 1

Synthesis of 10-bromodecamethylene phthalimide

After placing 85 parts by weight of potassium phthalimide, 1008 parts by weight of 1,10-dibromodecane and 430 parts by weight of dimethylformamide (thoroughly dewatered) in a flask, the mixture was stirred and heated at 100° C. for 20 hours. After heating, all of the volatile components were removed and the residue was extracted with xylene. The volatile component was distilled off from the extracted solution, and the residue was allowed to stand at room temperature to obtain 10-bromodecamethylene phthalimide crystals.

Reference Example 2

Synthesis of N-phthalimidedecamethylene-2-heptadecylimidazole bromide

After stirring together 20 parts by weight of 2-heptadecylimidazole and 24 parts by weight of the phthalimidedecamethyleneimidazolium bromide obtained in Reference Example 1, stirring reaction was conducted for 8-10 hours at about 100° C. to obtain N-phthalimidedecamethylene-2-heptadecylimidazole bromide (formula below).

Reference Example 3

N-phthalimidedecamethylene-trioctylphosphonium bromide

After stirring together 20 parts by weight of trioctylphosphine and 20 parts by weight of the phthalimidedecamethyleneimidazolium bromide obtained in Reference Example 1, stirring reaction was conducted for 8-10 hours at about 100° C. to obtain N-phthalimidedecamethylene-trioctylphosphonium bromide (formula below).

Example 1

Synthesis of Cation-exchanged Layered Silicate

After placing 100 parts by weight of Kunipia F and 3000 parts by weight of water in a flask, the mixture was heated and stirred at 80° C. To this mixture there was added a solution of 83 parts by weight of PX416 by Nihon Kagaku Co. (formula below):

dissolved in 300 parts by weight of water, and the mixture was additionally stirred for 3 hours at 80° C. The solid was filtered off from the mixture, washed three times with methanol and three times with water, and then freeze dried to obtain a cation-exchanged layered silicate. The ion-exchange rate was 92%. The specific surface area of the layered silicate obtained in this manner was 5.5 $m^2$/g. The results for Example 1 are shown in Table 1 below.

Example 2

A 20 part by weight portion of the cation-exchanged layered silicate obtained in Example 1 was dispersed in 400 parts by weight of benzene and the dispersion was freeze dried. The specific surface area of the layered silicate obtained in this manner was 8.9 $m^2$/g. The results for Example 2 are shown in Table 1 below.

Example 3

After placing 100 parts by weight of Kunipia F, 3000 parts by weight of water and 500 parts by weight of methanol in a flask, the mixture was heated and stirred at 80° C. To this mixture there was added a solution of 110 parts by weight of the N-phthalimidedecamethylene-2-heptadecylimidazole bromide obtained in Reference Example 2 dissolved in 300 parts by weight of methanol, and the mixture was additionally stirred for 3 hours at 80° C. The solid was filtered off from the mixture, washed three times with methanol and three times with water, and then freeze dried to obtain a cation-exchanged layered silicate. The ion-exchange rate was 68%. The specific surface area of the layered silicate obtained in this manner was 5.3 $m^2$/g. The results for Example 3 are shown in Table 1 below.

TABLE 1

| | | Example 1 | Example 2 | Example 3 |
|---|---|---|---|---|
| Modifier | | $C_4H_9-\overset{\overset{C_4H_9}{\mid}}{\underset{\underset{C_4H_9}{\mid}}{P^+}}-C_{16}H_{33}$  $Br^-$ | Same as left | $\underset{HN}{\overset{C_{17}H_{35}}{\mid}}\overset{\oplus}{\diagup}N-(CH_2)_{10}-N\begin{pmatrix}O\\\\O\end{pmatrix}$ (phthalimide)  $Br^-$ |
| Ion-exchange rate | (%) | 92 | 92 | 68 |
| Specific surface area | m²/g | 5.5 | 8.9 | 5.3 |
| Thermal decomposition temperature | °C. | 375 | Same as left | 370 |
| Interlaminar distance | nm | 2.3 | Same as left | 2.4 |

Example 4

After placing 100 parts by weight of Kunipia F, 3000 parts by weight of water and 500 parts by weight of methanol in a flask, the mixture was heated and stirred at 80° C. To this mixture there was added a solution of 120 parts by weight of the N-phthalimidedecamethylene-trioctylphosphonium bromide obtained in Reference Example 3 dissolved in 300 parts by weight of methanol, and the mixture was additionally stirred for 3 hours at 80° C. The solid was filtered off from the mixture, washed three times with methanol and three times with water, and then freeze dried to obtain a cation-exchanged layered silicate. The ion-exchange rate was 65%. The specific surface area of the layered silicate obtained in this manner was 5.5 m²/g. The results for Example 4 are shown in Table 2 below.

Example 5

A 20 part by weight portion of the cation-exchanged layered silicate obtained in Example 4 was dispersed in 400 parts by weight of cyclohexane and the dispersion was freeze dried. The specific surface area of the layered silicate obtained in this manner was 8.3 m²/g. The results for Example 5 are shown in Table 2 below.

Example 6

After placing 100 parts by weight of Fluoromica F (Co-Op Chemical Co., Ltd.) and 3000 parts by weight of water in a flask, the mixture was heated and stirred at 80° C. To this mixture there was added a solution of 92 parts by weight of PX416 by Nihon Kagaku Co. dissolved in 300 parts by weight of water, and the mixture was additionally stirred for 3 hours at 80° C. The solid was filtered off from the mixture, washed three times with methanol and three times with water, and then freeze dried to obtain a cation-exchanged layered silicate. The ion-exchange rate was 90%. The specific surface area of the layered silicate obtained in this manner was 5.9 m²/g. The results for Example 6 are shown in Table 2 below.

TABLE 2

| | | Example 4 | Example 5 | Example 6 |
|---|---|---|---|---|
| Modifier | | $C_8H_{17}-\overset{\overset{C_8H_{17}}{\mid}}{\underset{\underset{C_8H_{17}}{\mid}}{P^+}}-(CH_2)_{10}-N\begin{pmatrix}O\\\\O\end{pmatrix}$  $Br^-$ | Same as left | $C_4H_9-\overset{\overset{C_4H_9}{\mid}}{\underset{\underset{C_4H_9}{\mid}}{P^+}}-C_{16}H_{33}$  $Br^-$ |
| Ion-exchange rate | (%) | 65 | 65 | 90 |
| Specific surface area | m²/g | 5.5 | 8.3 | 5.9 |
| Thermal decomposition temperature | °C. | 374 | Same as left | 378 |
| Interlaminar distance | nm | 2.5 | Same as left | 2.4 |

Example 7

Production of Resin Composition

Figure 1:
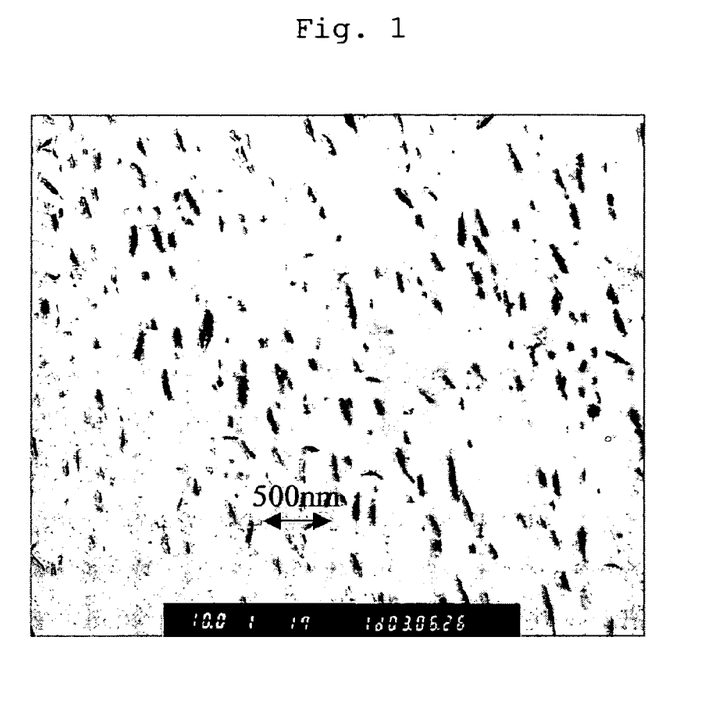
FIG. 1 is an electron micrograph of the resin composition of Example 7.

Poly(ethylene naphthalate) (reducing viscosity: 0.78) pellets and the layered silicate obtained in Example 1 were kneaded together using a counter-rotating twin-screw kneading extruder (Labo Plastomill 2D25S by Toyo Seiki) at an extrusion temperature of 280° C. and a screw rotation rate of 150 rpm, followed by discharge and water cooling to obtain strand-like pellets of a polyester resin composition. The results for the obtained resin composition are shown in Table 3. The resin composition was also observed with a transmission electron microscope (FIG. 1). As shown in this photograph, the layered silicate was very highly dispersed. The layered silicate layers were also separated.

Examples 8-12

Resin compositions were obtained in the same manner except that the layered silicate was changed to the layered silicates obtained in each of Examples 2-6. The results are shown in Tables 3 and 4.

Example 13

Polycarbonate (L1250, product of Teijin Chemical) pellets and the layered silicate obtained in Example 6 were kneaded together using a ZSK-25 (Werner & Pfleiderer) with an extrusion temperature of 280° C., a screw rotation rate of 280 rpm, an extrusion speed of 10 kg/hr and a shear rate of 1800/sec, followed by discharge and water cooling to obtain strand-like pellets of a polyester resin composition. The results for the obtained resin composition are shown in Table 4.

TABLE 3

| Resin | | Example 7 Poly(ethylene naphthalate) | Example 8 Poly(ethylene naphthalate) | Example 9 Poly(ethylene naphthalate) | Example 10 Poly(ethylene naphthalate) |
|---|---|---|---|---|---|
| Reduced viscosity | ηsp/C | 0.64 | 0.63 | 0.62 | 0.64 |
| Layered silicate | | Example 1 | Example 2 | Example 3 | Example 4 |
| Inorganic content | % | 2 | 2 | 2 | 2 |
| Melting point | °C. | 267 | 268 | 270 | 270 |
| Interlaminar distance | nm | 2.7 | 2.7 | 2.5 | 2.3 |
| Average no. of layers | — | 4.3 | 4.4 | 4.7 | 4.5 |

TABLE 4

| Resin | | Example 11 Poly(ethylene naphthalate) | Example 12 Poly(ethylene naphthalate) | Example 13 Poly-carbonate |
|---|---|---|---|---|
| Reduced viscosity | ηsp/C | 0.64 | 0.63 | 0.60 |
| Layered silicate | | Example 5 | Example 6 | Example 6 |
| Inorganic content | % | 2 | 2 | 2 |
| Melting point | °C. | 269 | 267 | 124 |
| Interlaminar distance | nm | 2.5 | 2.7 | 2.3 |
| Average no. of layers | — | 4.3 | 4.2 | 4.9 |

Examples 14, 15

Fabrication of Films

The strand-like chips obtained in Example 1 were dried at 170° C. for 5 hours and supplied to an extruder hopper, melted at a melt temperature of 300° C. and passed through a 1.3 mm slit-shaped die for extrusion onto a rotating cooling drum with a surface temperature of 80° C., to obtain an unstretched film. The unstretched film obtained in this manner was stretched to factors of MD×TD=3.0×3.0 and 4.0×4.0 at a temperature of 150° C. to obtain a biaxially stretched film with a thickness of 15 μm. The obtained biaxially stretched film was heat-fixed for one minute at 205° C. to obtain a polyethylene naphthalate/layered silicate composite film. The Young's moduli of the obtained films were, respectively, 7.1 GPa and 8.7 GPa in the MD directions.

Comparative Example 1

A layered silicate was obtained in the same manner as Example 1, except that the freeze drying was changed to vacuum drying at 150° C. The specific surface area was measured to be 1.70 m²/g.

Comparative Example 2

Figure 2:
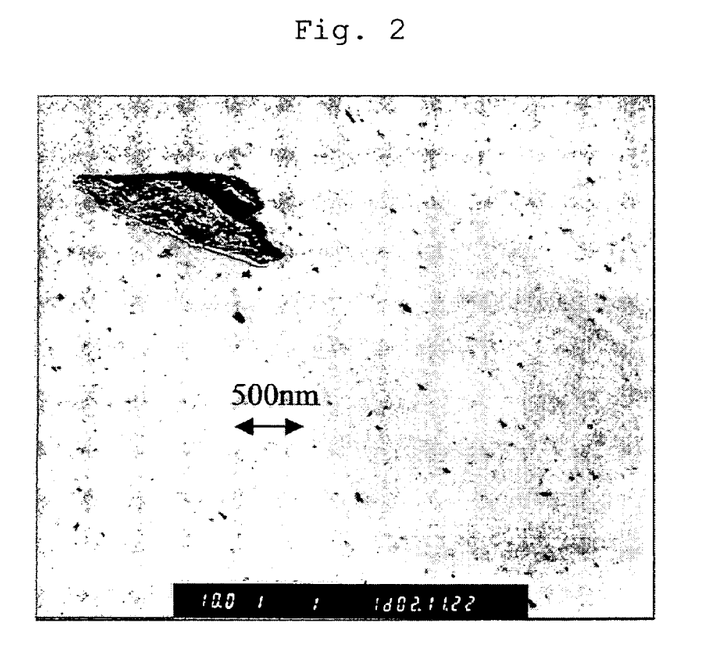
FIG. 2 is an electron micrograph of the resin composition of Comparative Example 2.

Poly(ethylene naphthalate) (reducing viscosity: 0.78) pellets and the layered silicate obtained in Comparative Example 1 were kneaded together using a counter-rotating twin-screw kneading extruder (Labo Plastomill 2D25S by Toyo Seiki) at an extrusion temperature of 280° C. and a screw rotation rate of 150 rpm, followed by discharge and water cooling to obtain strand-like pellets of a polyester resin composition. The obtained pellets were observed with a transmission electron microscope (FIG. 2). The dispersibility of the layered silicate was also reduced.

What is claimed is:

1. A layered silicate characterized by being ion-exchanged with an organic onium ion represented by the following formula (1):

(1)

wherein $R_1$, $R_2$, $R_3$ and $R_4$ each independently represent a C1-30 hydrocarbon group or a heteroatom-containing hydrocarbon group, M is a phosphorus atom to form a phosphonium group, or M is a nitrogen atom and any of $R_1$, $R_2$, $R_3$ and $R_4$ form a ring as a heteroaromatic ion, and at least a portion of $R_1$, $R_2$, $R_3$ and $R_4$ is an imide-substituted hydrocarbon group, at 50-100% of its ion-exchange capacity, and by having a specific surface area of 2.5-100 $m^2/g$.

2. A process for production of a layered silicate according to claim 1, characterized in that the organic onium ion-exchanged layered silicate is freeze dried using a medium with a melting point of at least −20° C. and below 100° C.

3. A process for production of a layered silicate according to claim 2, characterized in that the medium with a melting point of at least −20° C. and below 100° C. is a good dispersing medium for the layered silicate.

4. A resin composition comprising a thermoplastic resin and a layered silicate according to claim 1, the resin composition being characterized in that the layered silicate content is 0.01-20 parts by weight as inorganic ash with respect to 100 parts by weight of the thermoplastic resin, and the average number of layers of the layered silicate in the thermoplastic resin is 2-8 layers.

5. A process for production of a resin composition according to claim 4, wherein a single-screw or twin-screw extruder is used for melt kneading of the layered silicate with the thermoplastic resin.

6. A resin composition according to claim 4, wherein the thermoplastic resin is at least one selected from the group consisting of polyesters, polyamides, polyimides, polycarbonates, polyphenylenesulfides and polyolefin-based resins.

7. A film comprising a resin composition according to claim 4.

* * * * *